(12) United States Patent
Crombach et al.

(10) Patent No.: US 7,767,782 B2
(45) Date of Patent: Aug. 3, 2010

(54) SOLID-STATE POST-CONDENSATION PROCESS FOR INCREASING THE MOLECULAR WEIGHT OF A POLYAMIDE

(75) Inventors: Robert C. B. Crombach, Kerkrade (NL); Rudy Rulkens, Cadier en Keer (NL)

(73) Assignee: DSM IP Assets B.V., Heerlen (NL)

( * ) Notice: Subject to any disclaimer, the term of this patent is extended or adjusted under 35 U.S.C. 154(b) by 783 days.

(21) Appl. No.: 10/501,733

(22) PCT Filed: Jan. 7, 2003

(86) PCT No.: PCT/NL03/00003

§ 371 (c)(1), (2), (4) Date: Feb. 11, 2005

(87) PCT Pub. No.: WO03/062302

PCT Pub. Date: Jul. 31, 2003

(65) Prior Publication Data

US 2005/0119444 A1   Jun. 2, 2005

(30) Foreign Application Priority Data

Jan. 25, 2002   (EP) .................................. 02075325

(51) Int. Cl.
*C08G 69/28* (2006.01)

(52) U.S. Cl. ........................ 528/310; 528/480; 528/483; 528/499; 528/332; 528/503

(58) Field of Classification Search .................. 528/310, 528/312, 322, 332, 335, 336, 340
See application file for complete search history.

(56) References Cited

U.S. PATENT DOCUMENTS

| | | | | |
|---|---|---|---|---|
| 3,821,171 A * | 6/1974 | Beaton | ........................ | 528/481 |
| 5,859,177 A * | 1/1999 | Berger et al. | ................. | 528/310 |
| 5,955,569 A * | 9/1999 | Dujari et al. | ................. | 528/480 |
| 6,911,257 B2 * | 6/2005 | Van Ruiten et al. | ......... | 428/364 |

FOREIGN PATENT DOCUMENTS

| | | | |
|---|---|---|---|
| EP | 723 351 | | 9/1996 |
| WO | WO 9724389 | * | 7/1997 |
| WO | WO 9823666 | * | 6/1998 |
| WO | WO 03006724 | * | 1/2003 |

* cited by examiner

*Primary Examiner*—James Seidleck
*Assistant Examiner*—Gregory Listvoyb
(74) *Attorney, Agent, or Firm*—Nixon & Vanderhye P.C.

(57) ABSTRACT

The invention relates to a process for increasing the molecular weight of a polyamide via solid-state post-condensation by exposing the polyamide in the solid-state at elevated temperature to an inert gas atmosphere, that comprises a step (a) wherein the gas atmosphere to which the polyamide is exposed has a dew temperature $T_{dew-1}$, followed by a step (b) wherein the gas atmosphere to which the polyamide is exposed has a dew temperature $T_{dew-2}$, whereby $T_{dew-1}$ is higher than $T_{dew-2}$. The effect is that a high molecular weight polyamide can be obtained in a shorter production time.

11 Claims, No Drawings

SOLID-STATE POST-CONDENSATION PROCESS FOR INCREASING THE MOLECULAR WEIGHT OF A POLYAMIDE

CROSS REFERENCE TO RELATED APPLICATION

This application is the National Phase of International Application PCT/NL03/00003 filed Jan. 7, 2003 which designated the U.S., and was published in English.

The invention relates to a process for increasing the molecular weight of a polyamide via solid-state post-condensation by exposing the polyamide in the solid-state at elevated temperature to an inert gas atmosphere.

Solid-state post-condensation (SSPC) of a polyamide by exposing the polyamide in the solid-state at elevated temperature to an inert gas atmosphere is a well-known process for increasing the molecular weight of a polyamide. SSPC is often applied to polyamide prepolymers and commonly used in industry to prepare high molecular weight polyamides. SSPC of polyamides is practically always carried out at elevated temperature, in vacuum or in an inert atmosphere, mostly a nitrogen atmosphere. An inert gas atmosphere is understood to be a gas atmosphere essentially free of oxygen. The SSPC processes can be performed under inert gas with a water vapor content varying from 0% (dry gas) to 100% (superheated steam). Pressure and temperature are other process variables. High temperature and low water vapor content contribute to increasing the reaction rate of the solid-state post-condensation.

Such an SSPC process is known from M. Kulkarni and S. K. Gupta, Journal of Applied Polymer Science, (1994) Vol. 53, 85-103. In this paper the reaction rate modeling of SSPC of polyamide-6 type polyamides was studied. On pages 95 and 96 it is indicated and reported in a graph, that a high water concentration has a negative effect on the condensation kinetics, which effect is evident for residence times longer than 6 hours. In order to increase the reaction rate, the water concentration of the vapour phase surrounding the polyamide has to be reduced. This is effective only down to a certain level. As is mentioned on page 95, not much improvement is achieved by further reducing the water concentration to values below that level.

The object of the invention is to provide a solid-state post-condensation process for increasing the molecular weight of a polyamide by exposing the polyamide in the solid-state to an inert gas atmosphere, which process allows to further increase the reaction rate of the post-condensation reaction, thereby enabling a shorter production time to obtain a polyamide with increased molecular weight or resulting in a polyamide with an even higher molecular weight in the same production time both when compared to the known process at the same temperature.

This object is achieved in that the solid-state post-condensation process comprises a step (a) wherein the gas atmosphere to which the polyamide is exposed has a dew temperature $T_{dew-1}$, followed by a step (b) wherein the gas atmosphere to which the polyamide is exposed has a dew temperature $T_{dew-2}$, whereby $T_{dew-1}$ is higher than $T_{dew-2}$.

The effect of the solid-state post-condensation process comprising said two steps (a) and (b) according to the invention is that a polyamide with increased molecular weight can be obtained in a shortened production time.

An SSPC-process for a polyamide comprising 2 post-condensation steps is known from EP-A-0732351. The process according to EP-A-0732351 comprises a first step, wherein a polyamide prepolymer is heated to a first temperature and kept at that temperature for a predetermined period, and a second step, wherein the prepolymer is heated further to a second temperature and kept at that temperature. This publication focuses on polyamide-6.6 and prevention of volatilization of oligomers. In this publication it is indicated that a high moisture content of the inert gas is advantageous for reduced discoloration of the polyamide, but it is instructed that the dew temperature of the inert gas has to be between 0° C. and 30° C. There is no mentioning of a change in dew temperature for the gas atmosphere in the 2 steps, neither is there an indication for the measures according the invention having the desired advantageous effect.

A 2-step SSPC-process is also described in U.S. Pat. No. 3,821,171. This publication describes an SSPC process by heating polyamide-6.6 prepolymer granules in an inert gas atmosphere in a first step to a temperature below 205° C., and in a second step to a temperature above 205° C., while preferably the inert gas is essentially free of moisture. It is mentioned that the hotter and drier the inert gas is, the more rapidly will the molecular weight of the polymer be increased. There is no indication in U.S. Pat. No. 3,821,171 for the measures according the invention having the desired advantageous effect.

The process according to the invention for increasing the molecular weight of a polyamide via solid-state post-condensation by exposing the polyamide in the solid-state to an inert gas atmosphere, comprises a step (a) wherein the gas atmosphere to which the polyamide is exposed has a dew temperature $T_{dew-1}$, followed by a step (b) wherein the gas atmosphere to which the polyamide is exposed has a dew temperature $T_{dew-2}$, whereby $T_{dew-1}$ is higher than $T_{dew-2}$.

With solid-state is meant the state wherein the polyamide has a temperature below its melting temperature. The melting temperature of the polyamide is here understood to be the peak temperature of the melting peak measured by Differential Scanning Calorimetry (DSC) in an open cup with a heating rate of 10° C./min. For polyamides that decompose, rather than melt, when heated, the melting temperature is understood in this application to be the temperature, measured by DSC or thermogravimetrical analysis (TGA) in an open cup with a heating rate of 10° C./min, at which the polyamide starts to decompose.

An inert gas atmosphere is understood in this application to be a gas atmosphere essentially free of oxygen. Such a gas atmosphere can comprise, for instance, nitrogen, argon, carbon dioxide, steam or mixtures thereof. Typical pressures used for the gas atmosphere vary from 0.01 bar to 10 bar, depending on process and type of equipment.

The dew temperature of a gas atmosphere is understood to be the temperature at which, upon cooling of the gas atmosphere, the water vapor in the gas atmosphere starts to condense. Suitable methods for controlling the dew temperature of a gas atmosphere are, for example: mixing of a dry gas with 100% water vapor in the ratio that corresponds with the required dew temperature; cooling of a gas atmosphere containing excess water vapor to the temperature that equals the required dew temperature, such as by passing a through a scrubber in order to condens and remove the excess water; and drying of the feed gas by passing the gas through an absorbent such as molecular sieves or through a desiccant such as phosphorus pentoxide or the like.

During post-condensation of a polyamide, generally the molecular weight of the polyamide increases. Increase in molecular weight can for instance be followed by measuring the viscosity of a solution of the polyamide in a solvent suitable for dissolving the polyamide. The viscosity of polyamides is normally being measured in formic acid or in 96% sulfuric acid. The viscosity level can be expressed, for example, as a viscosity number (VN). Measurement of the viscosity in terms of a viscosity number is carried out according to ISO 307, with a polyamide concentration of 0.005 g/ml in 90 wt. % formic acid. In case the polyamide does not dissolve in formic acid, the viscosity number is measured in 96 wt. % sulfuric acid. (International Organization for Standardization. "Plastics-Polyamides-Determination of viscosity Number" ISO 307, second edition 1984-05-15).

The time needed for the post-condensation can be a predetermined time or can be determined by the moment at which a polyamide with a certain viscosity is obtained.

The process of the invention can be carried out in any reactor suitable for solid-state post-condensation of polyamides. Suitable reactors are mentioned for instance in Nylon Plastic Handbook (Kohan, Hanser Verlag Publishers, Munich, 1995, pages 28-29) and references cited therein and in in "Kunststof Handbuch, Band 3/4, Polyamiden" (Vieweg/Muller, Carl Hanser Verlag, Munchen, 1998, pages 651-652) and references therein. Examples of suitable reactors are, for instance, fixed bed reactors, moving bed reactors, rotary drums, tumble dryers, fluidized bed reactors and so on. Also any process type, suitable for solid-state post-condensation of polyamides, can be chosen for carrying out the process of the invention. Both batch as well as continuous operations can be practiced for this purpose. For the process of the invention carried out in a continuous operation a single flow-through reactor or a combination of more than one flow-through reactor might be used.

When a single flow-through reactor is used, the reactor preferably. comprises a section wherein the polyamide in step (a) is exposed to the gas atmosphere with dew temperature $T_{dew-1}$ and another section wherein the polyamide in step (b) is exposed to the gas atmosphere with dew temperature $T_{dew-2}$. The sections are not necessarily physically separated. Such a flow-through reactor having two sections as mentioned above, may comprise at least one gas inlet and one gas outlet for the gas atmosphere of step (a) thereby making-up the section for step (a) and at least one gas inlet and for the gas atmosphere of step (b) thereby making-up the other section for step (b).

When a combination of more than one flow-through reactor is used, preferably separate flow through reactors are used for exposing the polyamide in step (a) to the gas atmosphere with dew temperature $T_{dew-1}$ and for exposing the polyamide in step (b) to the gas atmosphere with dew temperature $T_{dew-2}$.

Also combinations of different types of reactors can be used for the SSPC-process of the invention. In a preferred embodiment of the invention, at least one step of the process, wherein the polyamide is exposed to a gas atmosphere of step (a) and/or of step (b), is carried out in a tumble dryer. The advantage of this embodiment is that the pellets are heated via the wall and no large gas streams are required. In another preferred embodiment of the invention, at least one step of the process, wherein the polyamide is exposed to a gas atmosphere, is carried out in a moving bed reactor. The advantage of this embodiment is that continuous operation is possible.

In the process according to the invention the polyamide can be any polyamide of which the molecular weight can be increased by SSPC. The polyamide may be a low molecular weight polyamide, such as a polyamide prepolymer, as well as a high molecular weight polyamide. The polyamide can also be a polyamide which has already undergone some kind of post-condensation process, but which needs a further post-condensation to attain a further increase in molecular weight. Polyamide prepolymers are the products, obtained from monomers suitable for the preparation of polyamides and prepared in a process generally known as a prepolymerization process. Known prepolymerization processes comprise melt-polymerization and solution-polymerization, e.g. as disclosed in EP 0 254 367. High molecular weight polyamides are understood to be polyamide polymers with a molecular weight suitable for one or more selected applications. By further increasing the molecular weight the polyamide might be made suitable for other applications as well. High molecular weight polyamides, particularly among them PA-6, PA-6.6, PA-4.6, PA-11, PA-12, and their copolymers, including semi-aromatic copolymers thereof, find wide application in many application fields, which include fibers, films and engineering plastics.

The polyamide in the process of the invention preferably is a polyamide prepolymer. This has the advantage that the conditions for the prepolymerization process and SSPC process can be optimized independently from each other, allowing maximum flexibility in each of the processes.

The SSPC process according to the invention can be applied for any type of polyamide, which can be any aliphatic polyamide, semi-aromatic polyamide or copolymer thereof. Aliphatic polyamides are polyamides prepared from (cyclo) aliphatic diamines and/or (cylco)aliphatic dicarboxylic acids, aliphatic $\alpha,\omega$-aminoacids, cyclic lactams, or mixtures of these monomers. Semi-aromatic polyamides are polyamides prepared from aromatic diacids in combination with aliphatic diamines or aromatic diamines in combination with aliphatic dicarboxylic acids or mixtures thereof. Polyamide copolymers are understood in this application to include also polyamide terpolymers, quarterpolymers and higher. Polyamide copolymers are polyamides that can be prepared from mixtures of at least 2 diamine monomers with at least one dicarboxylic acid and/or mixtures of at least 2 dicarboxylic acids with at least one diamine and/or mixtures of at least 2 aliphatic $\alpha,\omega$-aminoacids and/or cyclic lactams dicarboxylic acid monomers and/or mixtures of at least one diamine, one dicarboxylic acid and at least one aliphatic $\alpha,\omega$-aminoacid or cyclic lactam.

Suitable aliphatic diamines are, for instance, linear, branched and cyclic C2-C15 diamines. Examples of suitable aliphatic diamines are 1,4-butanediamine, 1,6-hexanediamine, 2-methyl-1,5-pentamethylenediamine (MPMA), 1,9-nonanediamine, 1,11-undecanediamine and 1,12-dodecanediamine. m-xylylene diamine (MXD), 1,3-diaminomethylcyclohexane (h-MXD), p-xylylene diamine (PXD), 1,4-diaminomethylcyclohexane (h-PXD), and 1,4-diaminocyclohexane (hXD).

Suitable aliphatic dicarboxylic acids are for instance linear, branched and cyclic C4-C15 dicarboxylic acids. Examples of suitable aliphatic dicarboxylic acids are, for instance, adipic acid, dodecanoic acid and p-cyclohexane dicarboxylic acid (CHDA).

Suitable aliphatic $\alpha,\omega$-aminoacids include C4-C12 $\alpha,\omega$-aminoacids. Examples of suitable $\alpha,\omega$-aminoacids are, for instance, aminocaproic acid, aminoundecanoic acid, 4-aminomethyl benzoic acid (AMB).

Suitable cyclic lactams are, for instance, caprolactam, caprylolactam, and dodecalactam.

Suitable aromatic dicarboxylic acids include orthophthalic acid, isophthalic acid (I), terephthalic acid (T) and naphthalene dicarboxylic acid (N).

Examples of suitable polyamides are, for instance, PA-4.6, PA-6.6, PA-hXD.6, PA-PXD.6, PA-h-PXD.6, PA-MXD.6, PA-4.N, PA-6.T, PA-9.T, PA-12.T, PA-MXD.T, PA-h-MXD.T, PA-MPMA.T, PA-6, PA-hXD.12, PA-MXD.12 and PA-PXD.12 Examples of suitable copolyamides are, for instance, PA-4.6/6, PA-4.6/6.6, PA-4.6/4.12, PA-4.6/4.16, PA-4.6/4.T, PA-4.6/4.CHDA, PA-6.6/6.T, PA-6/6.T, PA-11/6.T, PA-12/6.T, PA4.T/6.T, PA-6.T/6.1, PA-6.T/6.CHDA, PA-6/AMB. Examples of suitable terpolyamides are, for instance PA-4.6/6.T, PA-4.6/4.T/4.1, PA-6.6/6.T/6.1 and PA-T/6.6/6.

The process of the invention is advantageously applied to polyamides that have limited sensitivity to discoloration under SSPC conditions. This has the advantage that the SSPC process can be optimised for post-condensation time reduction without being critical for discoloration of the polyamide. Examples of suitable polyamides are polyamide-6 and polyamide-12.

The process is also advantageously applied for polyamides with low melting temperature. It has been found that the SSPC can be conducted at lower temperature to reach the same increase in molecular weight in the same time, while there is les risk of sticking of polyamide particles. Examples of polyamides with low melting temperature are PA-6, PA12, PA11 and copolyamides thereof. These polyamides generally have a melting temperature below about 250° C., more preferably below 230° C. Preferably, the polyamide is PA-6, since the SSPC process according to the invention can result in a reduced formation of caprolactam monomer by depolymerization of the polyamide, which effect is enhanced when the SSPC process is conducted at lower temperature.

In another respect, the invention relates in particular to polyamides, which are prone to yellowing under SSPC conditions with low dew temperature. Examples of such polyamides are polymide-4.6, polyamide-6.6, semi-aromatic polyamides and copolymers of these polyamides. More particular, the invention relates to polyamides having a high melting temperature, i.e. having a melting point above 260° C., more particular above 280° C. Examples of such polyamides are polyamide-4.6 and copolymers thereof, copolymers of polyamide-6.6 and semi-aromatic polyamides, and include the copolymers PA-4.6/4.16, PA4.6/4.T, PA4.6/4.CHDA, PA-6.6/6.T, PA-6/6.T, PA-11/6.T, PA-12/6.T, PA4.T/6.T, PA-6.T/6.1 and PA-6.T/6.CHDA.

The advantage of the process according to the invention in combination with the above polyamides is that, in comparison with the known SSPC process wherein high molecular weight polyamides are obtained in short production time, such high molecular weight polyamides can be obtained in even shorter production time and with limited discoloration, compared to the known process performed at the same temperature.

Discoloration of the polyamide can be determined, for example, by measuring the yellowness index (YI). A method for measuring the yellowness index is described in "Yellowness-index of plastics" ASTM D 1925 1977.

The invention in particular relates to a process wherein the polyamide is chosen from the group of polyamide-4.6 and copolymers thereof. More particular, the invention relates to polyamides based on 1,4-diaminobutane, adipic acid, and optionally 0 to 50% other monomers, in particular those with more than 20% other monomers. Polyamide-4.6 has a melting point of around 290° C. and is quite sensitive to yellowing under SSPC conditions. Copolymers of polyamide-4.6 with terephthalic acid generally have higher melting temperatures and are even more prone to yellowing under SSPC conditions. The advantage of the process of the invention wherein the polyamide is based on 1,4-diaminobutane, adipic acid, and optionally 0 to 50% other monomers, is that high molecular weight polyamide polymer can be obtained in substantially shortened post-condensation time, compared to the known process for the same polyamide, while discoloration of the polymer can be limited to acceptable low level. Under particular circumstances even an essentially white polyamide is obtained while the postondensation time is substantially shortened. An essentially white polyamide is considered to be a polyamide with a yellowness index equal or less than 10.

The effect of the solid-state post-condensation process comprising said two steps (a) and (b) according to the invention is that a polyamide with increased molecular weight can be obtained in shortened production time. This effect is enhanced with the process according to the invention, wherein $T_{dew-1}$ is at least 10° C. above $T_{dew-2}$. Preferably, $T_{dew-1}$ is at least 20° C. above $T_{dew-2}$, more preferably at least 30° C. above $T_{dew-2}$, even more preferably $T_{dew-1}$ is at least 50° C. above $T_{dew-2}$, since this results in even shorter production times.

In the process of the invention, the gas atmosphere in step (b) preferably has a dew temperature of at most 20° C. This has the advantage that the rate at which the viscosity increases is further enhanced and that the post-condensation time can be shortened. More preferably, $T_{dew-2}$ is at most 0° C., since a gas atmosphere with such a low dew temperature enhances the post-condensation speed even more. Even more preferably, the gas atmosphere in step (b) consists of dry nitrogen. This gas atmosphere comprises less than 10% of inert gases other than nitrogen and has a dew temperature of at most 0° C. Such a gas atmosphere in step (b) has the advantage that the increase in viscosity of the polyamide is further speeded-up and that shorter times are needed for the post-condensation. It is further advantageous to recycle the gas atmosphere of step (b) to save on nitrogen and energy costs. Most preferably, the gas atmosphere in step (b) has a $T_{dew-2}$ of 0° C. to −30° C. This has the advantage that an optimum in post-condensation speed is obtained with limited discoloration of the polyamide and the dew temperature can be regulated with molecular seives.

In another preferred embodiment of the invention, $T_{dew-1}$ is at least 30° C. This has the advantage that a high molecular weight polyamide with a reduced yellowing, if any, can be obtained. More preferably $T_{dew-1}$ is at least 50° C., allowing for obtaining a polyamide with increased molecular weight with even less yellowing, if any. Even more preferably, $T_{dew-1}$ is at least 70° C. The advantage of such a gas atmosphere is that the polyamide does not exhibit any discoloration in step (a). Such a gas atmosphere has a high heat capacity, thereby enabling a very efficient heating of the polyamide via the gas stream and, when based on nitrogen, is low in nitrogen consumption. For example dry heated steam can be used. $T_{dew-1}$ is limited by the temperature and pressure of the gas atmosphere used in step a.

The process of the invention is carried out at elevated temperature, which temperature is below the melt temperature of the polyamide. The process wherein the gas atmospheres of step (a) and step (b) have a temperature between 20° C. and 100° C. below the melting temperature of the polyamide polymer has the advantage that sticking of polymer particles does not take place, no significant decomposition of the polyamide takes place and post-condensation still proceeds with acceptable speed.

A further preferred embodiment of the invention is a process wherein the gas atmosphere of step (a) has a temperature $T_{gas-1}$ and the gas atmosphere in step (b) has a temperature $T_{gas-2}$, whereby gas temperature $T_{gas-1}$ is at least 10° C. higher than gas temperature $T_{gas-2}$. The advantage is that discoloration in step (b), if any, is reduced. A further advantage is that the gas atmosphere of step (a) can be used to heat the polyamide and energy costs can be reduced.

In the process according to the invention 3 typical viscosities can be discriminated: the viscosity of the polyamide before it is exposed to the SSPC process of the invention, which viscosity is referred to as the initial-viscosity and expressed in terms of viscosity number $VN_0$; the viscosity which the polyamide has at the end of step (a), which viscosity is referred to as the intermediate-viscosity and expressed in terms of viscosity number $VN_{int}$; and the viscosity of the polyamide at the end of step (b) of the SSPC process, which is referred to as the end-viscosity and expressed in terms of viscosity number $VN_{end}$.

The polyamide in the process of the invention preferably has an initial-viscosity number $VN_0$ of at most 100 ml/g, since this allows for a larger reduction in time needed for the SSPC process. More preferably, $VN_0$ is at most 50 ml/g, even more preferably at most 25 ml/g, since this allows for an even larger reduction in SSPC process time.

The process of the invention is advantageously carried out when at the end of step (a), the polyamide has an intermediate-viscosity corresponding with a viscosity number $VN_{int}$ and at the end of step (b) the polyamide polymer has an end-viscosity corresponding with a viscosity number $VN_{end}$, whereby $VN_{int}$ is at most 90% of $VN_{end}$, with the viscosity numbers measured with the method according ISO 307. The advantage of such a process is that there is additional reduction in time needed for the overall post-condensation to reach the desired end viscosity. More preferably $VN_{int}$ is at most 80% of $VN_{end}$ and even more preferably $VN_{int}$ is at most 70% of $VN_{end}$, which leads to even further reduction in the overall post-condensation time. Preferably, $VN_{int}$ is at least 30% of $VN_{end}$, more preferably at least 50% of $VN_{end}$.

The process of the invention is preferably carried out in such a way that step (b) is started after the polyamide in step (a) has obtained an intermediate-viscosity corresponding with a viscosity number $VN_{int}$ of at least 70 ml/g, measured with the method according ISO 307. It has been found, that in case the polyamide is sensitive to yellowing, once the polyamide has obtained a $VN_{int}$ of at least 70 ml/g, the polyamide is less sensitive to color changes. More preferably, $VN_{int}$ is at least 100 ml/g, even more preferably at least 130 ml/g. The advantage is that the polyamide is even less sensitive to further color changes. Preferably, $VN_{int}$ is at most 180 ml/g, more preferably at most 150 ml/g.

The process of the invention can be applied for pure polyamides. It can also be applied for blends of polyamides and for polyamides, which comprise at least one additive chosen from a group comprising fillers, reinforcing agents, flame retardants, colorants, and stabilizers. For this purpose the polyamide is first compounded with the additive and than subjected to the SSPC process of the invention. An advantage is that the compounding can be done while the polyamide still has a low viscosity, as a result of which the compounding can be done under milder conditions, compared with compounding of the polyamide with the additive after the SSPC process, and less degradation of the polymer occurs. Another advantage is that compounds of polyamides comprising at least one additive can be made with higher additive content. Preferably, the additive is a filler or a reinforcing agent. An additional advantage is that for abrasion sensitive additives less degradation occurs. The invention therefore also relates to a process wherein the additive is an abrasion sensitive additive. An example of an abrasion sensitive additive is glass fibers.

The invention is further elucidated with reference to the following examples.

Methods

Yellowness Index

A sample of about 25 g polyamide is cryogenically ground to particles with average particle size smaller than 2 mm and charged into a cylindrical glass container (diameter 4 cm) with a flat transparent bottom. The Yellowness Index is measured according "Yellowness-index of plastics" ASTM D 1925 1977. The L, a and b values are determined by putting the glass bottom in front of the detector of a Minolta Chroma CR-210 calorimeter. The yellowness index (YI) is calculated as follows: $YI=100*(0.72*a+1.79*b)/L$.

Viscosity Number

A sample of polyamide is cryogenically ground to particles with average particle size smaller than 2 mm. After grinding, the polyamide is dried 16 h at 105° C. under vacuum. The viscosity number was determined according to ISO 307 on a solution of 0.5 gram of the ground polyamide in 100 ml of aqueous formic acid (90.0 m/m %, density D20/4 1, 2040 g/ml) at 25 ° C.

For polyamides with low initial viscosity, for example with $VN_0$ below 50 ml/g, drying shall be performed at lower temperature, such as 45° C. in vacuum for 3 hrs, to prevent premature psot condensation.

Melting Temperature

A sample of about 3-5 mg polyamide is taken from a cryogenically ground representative sample of polyamide of at least about 20 gr. The melting temperature is measured according to ASTM D3417-97/D3418-97 with DSC at a heating rate of 10° C./min on the first heating curve. The DSC sample shall be at essentially atmospheric conditions during the measurement i.e. allowed to evaporate volatile components like water formed by post condensation during the measurement.

Experiment I: Preparation of Polyamide Prepolymer I

A polyamide-4.6 prepolymer, and compacted powder pellets thereof, were prepared according to patent EP 0 254 367, example 1. The characteristic properties of the prepolymer were the same as mentioned in the referred example. The prepolymer had a viscosity number VN of about 11 ml/g, a peak melting temperature of about 290° C. and a yellowness index of 2.4. The water content was 6 wt. %.

SSPC Processes at 230° C.

Comparative Experiment A

Polyamide-4.6 prepolymer compacted powder pellets of Experiment I were charged at a temperature of 20° C. into a tube reactor of length 40 cm such that the pellets filled the tube over a length of 25 cm. The tube reactor was equipped with a thermocouple, positioned in the center of the tube. The pellets were exposed to a nitrogen gas atmosphere with a dew temperature of 72° C. The total gas stream was maintained at 34.6 $kmol/(m^2 \cdot h)$ at a pressure of 1 bar. The temperature of gas and reactor wall was maintained at 230° C., so that an equilibrium pellet temperature of 230° C. was reached. The SSPC time measurement was started from the moment that the pellets in the reactor had reached a temperature that was 30° C. below the temperature of the gas and reactor wall. At regular time intervals, samples were taken from the top of the reactor by transferring 10 g of compacted pellets into a glass container, maintaining the atmosphere inside the container and around the sample inert. At the end of the process, the glass container was flushed with a stream of nitrogen of room temperature. Thus, cooling down of the polyamide to a temperature below 50° C. within 5 minutes was ensured. With the samples taken at regular time intervals during the SSPC process, the viscosity number and the yellowness index of the samples were measured. VN and YI were measured after 20 hrs SSPC as well as after a time required to reach VN=160 ml/g. The results are presented in Table I.

Comparative Experiment B: Dry Nitrogen Gas

Analogously to Comparative Experiment A, compacted powder pellets of the polyamide-4.6 prepolymer of Experiment I were charged to the tube reactor with similar filling height. The pellets were exposed to a flow of nitrogen gas atmosphere with a dew temperature of −60° C. and a gas temperature of 230° C. The flow rate was kept at 34.6 kmol/($m^2 \cdot h$). The viscosity number and yellowness index of samples taken at regular time intervals were measured. VN and YI were measured after 20 hrs SSPC as well as after a time required to reach VN=160 ml/g. The results are presented in Table I.

Comparative Experiment C: Hot Steam

Analogously to Comparative Experiment A, compacted powder pellets of the polyamide-4.6 prepolymer of Experiment I were charged to the tube reactor with similar filling height. The pellets were exposed to an atmospheric flow of a steam gas atmosphere with a gas temperature of 230° C. The flow rate was kept at 28.4 kmol/($m^2 \cdot h$). The viscosity number and yellowness index of samples taken at regular intervals were measured. VN and YI were measured after 20 hrs SSPC as well as after a time required to reach VN=160 ml/g. The results are presented in Table I.

EXAMPLE I

Polyamide-4.6 prepolymer compacted powder of Experiment I was charged to the tube reactor as in Comparative Experiment A and exposed for 10 hours to a nitrogen gas atmosphere with a dew temperature of 72° C. and a gas temperature of 230° C., whereby the gas atmosphere was lead over the compacted powder with a flow rate of 34.6 kmol/($m^2 \cdot h$). When the 10 hours had lapsed, the gas atmosphere to which the polyamide was exposed, was changed into a nitrogen gas atmosphere with a dew temperature of −60° C., while maintaining the gas temperature and gas flow rate at the same level.

The viscosity number and the yellowness index of the polyamide were measured at regular intervals. VN and YI were measured after 20 hrs SSPC as well as after a time required to reach VN=160 ml/g. The results are presented in Table I.

EXAMPLE II

Polyamide-4.6 prepolymer compacted powder of Experiment I was charged to the tube reactor as in Comparative Experiment A and exposed for 10 hours to a steam (H2O) gas atmosphere with a gas temperature of 230° C., whereby the gas atmosphere was lead over the powder with a flow rate of 28,4 kmol/($m^2 \cdot h$). After the 10 hours had lapsed, the gas atmosphere to which the polyamide was exposed, was changed into a nitrogen gas atmosphere with a dew temperature of −60° C. and a gas temperature of 230° C. with a flow rate of 34.6 kmol/($m^2 \cdot h$). The viscosity number and the yellowness index of the polyamide were measured on samples taken at regular time intervals. VN and YI were measured after 20 hrs SSPC as well as after a time required to reach VN=160 ml/g. The results are presented in Table I.

TABLE I

Results of SSPC processes at 230° C.

| Results from SSPC | Comp. Exp. A | Comp. Exp. B | Comp. Exp. C | Example I | Example II |
|---|---|---|---|---|---|
| Gasatmosphere | | | | | |
| $T_{dew-1}$ (° C.) | 72° C. | −60° C. | 100° C. | 72° C. | 100° C. |
| $T_{dew-2}$ started after time period (hours) | n.a.[1] | n.a.[1] | n.a.[1] | 10 | 10 |
| $T_{dew-2}$ (° C.) | n.a.[1] | n.a.[1] | n.a.[1] | −60° C. | −60° C. |
| Results after 20 hours SSPC | | | | | |
| VN (ml/g) | 153 | 153 | 145 | 170 | 170 |
| YI | 2 | 44 | 2 | 10 | 10 |
| SSPC time (hours) needed to reach a VN of 160 ml/g | 22 | 22 | 26 | 16 | 16 |
| YI at that time | 2 | 44 | 2 | 7 | 6 |

[1]n.a. = not applicable

SSPC Processes at 243° C.

For Example III and Comparative Experiments D and E, the SSPC processes of respectively Example I and Comparative Experiments A and B were repeated except that the temperature at which the SSPC processes were carried out was at 243° C. The temperature of gas and reactor wall was maintained at 243° C. Viscosity number and yellowness index of samples taken at regular time intervals during the process were measured. VN and YI were measured after 15 hrs SSPC as well as after a time required to reach VN=185 ml/g. The results are presented in Table II.

TABLE II

Results of SSPC processes at 243° C.

| Results from SSPC | Comp. Exp. D | Comp. Exp. E | Example III |
|---|---|---|---|
| Gasatmosphere | | | |
| $T_{dew-1}$ (° C.) | 72° C. | −60° C. | 72° C. |
| $T_{dew-2}$ started after time period (hours) | n.a.[1] | n.a.[1] | 10 |
| $T_{dew-2}$ (° C.) | n.a.[1] | n.a.[1] | −60° C. |
| Results after 15 hours SSPC | | | |
| VN (ml/g) | 185 | 201 | 209 |
| YI | 3 | 41 | 6 |
| SSPC time (hours) needed to reach a VN of 185 ml/g | 15 | 13 | 12 |
| YI at that time | 3 | 40 | 4 |

[1]n.a. = not applicable

SSPC Processes at 217° C.

For Examples IV and Comparative Experiments F and G, the SSPC processes of respectively Example I and Comparative Experiments A and B were repeated except that the temperature at which the SSPC processes were carried out was at 217° C. The temperature of gas and reactor wall was maintained at 217° C. Viscosity number and yellowness index of the samples taken at regular time intervals during the process were measured. VN and YI were measured after 24 hrs SSPC as well as after a time required to reach VN=133 ml/g. The results are presented in Table III.

TABLE III

Results of SSPC processes at 217° C.

| Results from SSPC | Comp. Exp. F | Comp. Exp. G | Example IV |
|---|---|---|---|
| Gasatmosphere | | | |
| $T_{dew-1}$ | 72° C. | −60° C. | 72° C. |
| $T_{dew-2}$ started after time period (hours) | n.a.[1] | n.a.[1] | 10 |
| $T_{dew-2}$ | n.a.[1] | n.a.[1] | −60° C. |
| Results after 24 hours SSPC | | | |
| VN (ml/g) | 119 | 121 | 139 |
| YI | 2.5 | 35 | 11 |
| SSPC time (hours) needed to reach a VN of 133 ml/g | 31 | 32 | 24 |
| YI at that time | 2.6 | 37 | 9 |

[1] n.a. = not applicable

The results in Tables I-III show that with increasing temperature at which the SSPC process is carried out shorter SSPC times are needed to obtain polyamide polymers with high molecular weight. The results also show that, in case the SSPC process is carried out with a single gas atmosphere, as in Comparative Experiments A-G, representing an SSPC process with a single step, there is only a slight influence of the dew temperature of that gas atmosphere on the viscosity of the polymer obtained with a one step SSPC process at a certain temperature after a certain SSPC time. However, there is a large effect on the yellowness index of these polymers.

In comparison with Comparative Experiments A-C, the Examples I-II, and analogously the Example III in comparison with Comparative Experiments D-E and the Example IV in comparison with Comparative Experiments F-G, show that an SSPC process with 2 steps wherein dew temperature of step 1 is higher than dew temperature of step 2 results in polymers with higher viscosities in the same SSPC time or require a shorter SSPC time to reach the same viscosity level, compared to a 1-step SSPC process conducted at the same temperature. Moreover, with the 2 step process according to the invention there is only limited yellowing. Comparison of the Examples I and II, III and IV with the corresponding Comparative Experiments B, E and G, respectively, wherein only a gas atmosphere with a dew temperature of −60° C. is used, show that the 2-step processes according to the invention result in polyamide polymers with a much lower yellowing index, even when the post-condensation has proceeded to viscosity levels which are substantially higher than in the one-step process.

The invention claimed is:

1. Process for increasing the molecular weight of a polyamide via solid-state post-condensation by exposing the polyamide prepolymer in the solid-state at elevated temperature to an inert gas atmosphere, wherein the process comprises a step (a) wherein the gas atmosphere to which the polyamide is exposed has a dew temperature $T_{dew-1}$ followed by a step (b) wherein the gas atmosphere to which the polyamide is exposed has a dew temperature $T_{dew-2}$, whereby $T_{dew-1}$ is higher than $T_{dew-2}$, and wherein the gas atmosphere of step (a) has a temperature $T_{gas-1}$ and the gas atmosphere in step (b) has a temperature $T_{gas-2}$ such that $T_{gas-1}$ is at least 10° C. higher than $T_{gas-2}$, and wherein at the end of step (a), the polyamide has an intermediate-viscosity corresponding with a viscosity number $VN_{int}$ and at the end of step (b) the polyamide polymer has an end-viscosity corresponding with a viscosity number $VN_{end}$, whereby $VN_{int}$ is at most 90% of $VN_{end}$, measured according to ISO 307.

2. Process according to claim 1, wherein the polyamide is polyamide-6 or polyamide-12.

3. Process according to claim 1, wherein the polyamide has a melting temperature of at least 260° C.

4. Process according to claim 3, wherein the polyamide is chosen from the group consisting of polyamide-4.6, copolymers thereof, polyamide-6.6 and copolymers thereof.

5. Process according to claim 1, wherein $T_{dew-1}$ is at least 10° C. higher than $T_{dew-2}$.

6. Process according to claim 1, wherein $T_{dew-2}$ is at most 20° C.

7. Process according to claim 1, wherein $T_{dew-1}$ is at least 30° C.

8. Process according to claim 1, wherein the gas atmospheres of step (a) and step (b) have a temperature between 20° C. and 100° C. below the melting temperature of the polyamide polymer.

9. Process according to claim 1, wherein the polyamide has an initial- viscosity number $VN_0$ of at most 100 ml/g.

10. Process according to claim 1, wherein step (b) is started after the polyamide in step (a) has obtained an intermediate-viscosity corresponding with a viscosity number $VN_{int}$ of at least 70 ml/g, measured according to ISO 307.

11. Process according to claim 1, wherein the polyamide comprises at least one additive chosen from the group consisting of fillers, reinforcing agents, flame retardants, colorants and stabilizers.

* * * * *